US007779262B2

(12) United States Patent
Kim et al.

(10) Patent No.: US 7,779,262 B2
(45) Date of Patent: Aug. 17, 2010

(54) SECURITY METHOD USING ELECTRONIC SIGNATURE

(75) Inventors: Dae-youb Kim, Seoul (KR); Hwan-joon Kim, Seoul (KR); Maeng-hee Sung, Seoul (KR); Weon-il Jin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 986 days.

(21) Appl. No.: 11/411,926

(22) Filed: Apr. 27, 2006

(65) Prior Publication Data

US 2006/0248339 A1 Nov. 2, 2006

(30) Foreign Application Priority Data

Apr. 27, 2005 (KR) .................. 10-2005-0035214

(51) Int. Cl.
*H04L 9/32* (2006.01)
*H04L 9/08* (2006.01)
(52) U.S. Cl. ................. 713/180; 713/155; 380/281; 380/282
(58) Field of Classification Search ......... 713/155–159, 713/176–181; 380/28–30, 44–47, 277–286
See application file for complete search history.

(56) References Cited

U.S. PATENT DOCUMENTS 7,529,928 B2 * 5/2009 Micali ..................... 713/158

| 2003/0081785 | A1* | 5/2003 | Boneh et al. ........... 380/277 |
| 2004/0010700 | A1* | 1/2004 | Mont ..................... 713/189 |
| 2004/0019779 | A1* | 1/2004 | Harrison et al. ........ 713/150 |
| 2004/0073790 | A1* | 4/2004 | Ateniese et al. ........ 713/165 |
| 2004/0252830 | A1* | 12/2004 | Chen et al. .............. 380/30 |

OTHER PUBLICATIONS

Gene Tsudik, Weak Forward Security in Mediated RSA, 2003, Springer-Verlag Berlin Heidelberg.*
Alfred J. Menezes, Handbook of applied cryptography, 1997, CRC Press LLC, pp. 3-7 of attached document.*

* cited by examiner

*Primary Examiner*—Kambiz Zand
*Assistant Examiner*—Michael Guirguis
(74) *Attorney, Agent, or Firm*—Sughrue Mion, PLLC

(57) ABSTRACT

A security method using an electronic signature, which improves the performance of an electronic signature authentication by generating and verifying an electronic signature using a mediator, and acquires a forward security in an electronic signature generation and verification by adding a forward secure signature of semi-trusted party (SEM) to a partial signature value generated based on a secret key piece of the SEM. A public key and an optional secret key composed of two kinds of pieces are generated by a certificate authority in response to a request from a user terminal device. The secret key pieces are issued to the user terminal device and a semi-trusted party not to be overlapped with each other. A first signature piece generated from the issued pieces of the private key is transmitted to the user terminal device from the semi-trusted party when a certificate of the user terminal device is still valid.

9 Claims, 4 Drawing Sheets

FIG. 3

|  |  |  | mRSA | Additional | |
|---|---|---|---|---|---|
|  |  |  |  | WFS+mRSA | WFS+mRSA |
| Exponentiation | Signing | USER | $d_u + e$ | $e^i$ | $e^i$ |
|  |  | SEM | $d_s$ | $e^i$ | $e^i + (2 \times u_i)$ |
|  | Verifying | | $e$ | $e^{T-i}$ | $e^{T-i} + w_i$ |
| Storage | User | | | 1 index | 1index,T public keys |
|  | SEM | | | 1 index | 1index,T private keys |
| Forward Security | | | | Weak | Strong |

SECURITY METHOD USING ELECTRONIC SIGNATURE

CROSS-REFERENCE TO RELATED APPLICATIONS

This application claims benefit under 35 U.S.C. §119 from Korean Patent Application No. 2005-35214 filed on Apr. 27, 2005, the entire content of which is incorporated herein by reference.

BACKGROUND OF THE INVENTION

1. Field of the Invention

The present invention relates to a security method using an electronic signature, and more particularly, to a security method using an electronic signature, which effectively authenticates a signature through a mediator and guarantees a forward security.

2. Description of the Related Art

A security system is typically associated with an authentication system and a data encryption system. Although there exists other systems, the encryption system is generally classified into a secret key (referred to as 'symmetric key') system and a public key (referred to as 'asymmetric key') system. The secret key system, namely, the symmetric key system, uses the same key for encryption and decryption. In the secret key system, it is necessary to keep the secrecy of a key in such a manner that only rightful persons know and possess a common secret key.

In general, a public key based encryption scheme is widely used to perform an electronic signature. Such an encryption scheme uses a pair of keys where one is public so that anyone may use it, whereas a private person keeps the other secretly. The former is referred to as 'public key', whereas the latter is referred to as 'secret key'.

The secret key is a key that a private person should sign to have it through a storage medium having a secret security function. In contrast to this, the public key is a key used when a verifier verifies a signature.

Here, there is a problem in judging whether or not a verified public key is valid. To solve the problem, a certificate authority (CA) issues a public key certificate verifying the validity.

The public key certificate contains a public key, a valid period and a signature of the CA. The CA authenticates a validity of the public key during a descried valid period.

However, there may occur a case that even a certificate normally issued by the CA is revoked. In order to check the occurrence of the above-mentioned case, a signature verifier should always confirm whether or not a corresponding certificate has been revoked. There are problems in that the signature verifier should verify such a certificate revocation list (CRL) every time. For example, with regard to mobile communication, because the signature verifier uses a bandwidth to transmit data, transmission of the CRL requires great expense.

During a valid period, although a public key certificate is revoked at any time, since the time when the public key certificate is registered on the CRL coincides with an update time of a system, a deviation of a revocation time occurs.

A mediated Rivest, Shamir, and Adelman (mRSA) digital signature scheme was suggested to solve such an economical problem and a confirmation problem of a certificate revocation.

FIG. 1 is a view that illustrates a conventional security method in an mRSA scheme. With reference to FIG. 1, in the mRSA scheme, a semi-trusted party (SEM) 30 is adopted as a mediator for mediating an authentication of a public key although the mRSA scheme is inferior to a CA 10 with respect to reliability.

In the mRSA scheme, the authority party 10 generates a secret key d and a public key e. The secret key d is divided into a user key $d_u$ to be used in the user terminal device 20 and a computation key $d_s$ to be used in the semi-trusted party 30. That is, the d, $d_u$, and $d_s$ have a relation satisfying the condition of $d=d_u+d_s$. Only when two secret key pieces are present, a secret key to be used in an original signature is effected. When a user terminal device 20 wants to sign a signature, the user terminal 20 calculates and transmits a message hash value h to the SEM 30. Assuming that H is an appropriate hash function, h=H (m).

Next, the SEM 30 confirms whether or not a certificate used in the user terminal device 20 has been revoked. Only when the certificate has not been revoked, the SEM 30 performs a calculation operation. The SEM 30 signs m at a transmitted hash value h using $d_s$ to calculate and transmit a signature value $PS_s = h^{d_s}$, mod n of the SEM 30 side to the user terminal device 20.

The user terminal device 20 generates a signature and confirms a validity of the generated signature based on a signature value $PS_u = h^{d_u}$ mod n of a user side calculated using $d_u$ and $PS_s$ from the SEM 30.

That is, the user terminal device 20 calculates $h' = PS_e = (PS_s * PS_u)^e$ mod n. When h' is identical with h, the user terminal device 20 regards and uses PS ($=PS_s * PS_u$ mod n) as a valid signature.

On the other hand, besides the aforementioned mRSA scheme, a forward security becomes an issue in a general electronic signature generating and verifying scheme. For example, in a case where a certificate was revoked in 2000, when a user wants to forge a document written in 1999, it is recognized as a valid public key certificate prior to a point of the revocation. Accordingly, a verifier cannot judge the validity of the document. A forward security can prevent such a problem.

In the aforementioned mRSA scheme, there are no ways to prevent all used secret keys $d_s$ and $d_u$ from being exposed. So as to solve such a problem, a weak forward secure mRSA scheme has been suggested. Here, the 'weak' means that a forward security problem may be solved when only one of $d_s$ and $d_u$ composed of a secret key is exposed.

However, the SEM is not perfectly reliable, the $d_s$ is a key having a possibility to be exposed. In a case that an attacker of a system acquires $d_s$ during a period i, when the person conspires with a malicious user, they may easily acquire a necessary signature.

As a result, once $d_s$ is exposed, since a necessary signature is able to be acquired through a conspiracy of the attacker and the user, the system is exposed in a defenseless state that causes the forward security not to be effective.

SUMMARY OF THE INVENTION

Accordingly, it is an aspect of the present invention to provide a security method using an electronic signature, which improves a performance of an electronic signature authentication by generating and verifying an electronic signature using a mediator, and acquires a forward security in an electronic signature generation and verification by adding a forward secure signature of an SEM to a partial signature value generated based on a secret key piece of the SEM.

The above aspect of the present invention is substantially realized by providing a security method using an electronic signature, including the steps of: (a) generating a public key and an optional secret key composed of two kinds of pieces by a certificate authority in response to a request from a user terminal device; (b) issuing the secret key pieces to the user terminal device and a semi-trusted party not to be overlapped with each other; and (c) transmitting a first signature piece generated from the issued pieces of the private key to the user terminal device from the semi-trusted party when a certificate of the user terminal device is still valid.

Preferably, but not necessarily, the method may further include: (d) calculating the first signature piece and a second signature piece by the user terminal device to generate a signature value, the second signature is generated by a combination of an issued secret key piece and a predetermined value; and (e) confirming whether the signature value is valid.

In the step (a), the public key ($e, w_i$) may be an optimal number satisfying a condition given by $1<e, w_i<\Phi(n)$ under a condition of $\{e, w_i | 1 \leq i \leq T\} \subset Z^*_{\Phi(n)}$, by calculating an equation $n=p*q$ (where, it is assumed that i is an optimal even number, p and q each is a predetermined prime number having $$\frac{i}{2}$$

bit, i represents an optional period when a time axis is divided by a predetermined time unit, and T represents a maximum value of an interval time to update an electronic signature generating and verifying system.

Also, in the step (a), the secret key generated by the certificate authority may be ($d, v_i$), which is given by equations $d \equiv e^{-1} \mod \Phi(n)$ and $v_i \equiv w_i^{-1} \mod \Phi(n)$. Here, the method may further include the step of calculating a user's secret key piece value $d_u$ and a mediator's secret key piece value $d_s$, which is given by an equation $d_s = d - d_u \mod \Phi(n)$, where, it is satisfied that $d = d_u + d_s$, and $d_u$ is an optimal number satisfying a condition of $d_u \in Z_n - \{0\}$.

In the step (b), the certificate authority calculates and issues a user's secret key value $d_{0,u}$ during a first period, which is given by $d_{0,u} \equiv d_u \times e^{-T} \mod \Phi(n)$ and a mediator's secret key value $d_{0,s}$ during the first period, which is given by $d_{0,s} \equiv d_s \times e^{-T} \mod \Phi(n)$, to the user terminal device and the semi-trusted party.

Most preferably, the user terminal device may calculate a user's secret key value $d_{i,u}$ during i period using the issued $d_{0,u}$ by an equation $d_{i,u} = d_{0,u} \times e^i$, and the semi-trusted party calculates a mediator's secret key value di, s during i period using the issued $d_{0,s}$ by an equation $d_{i,s} = d_{0,s} \times e^i$. The first signature piece value may be $PT_{i,s}(m)$ and $PS_{i,s}(m)$, which is given by $PT_{i,s}(m) = h^{v_i}$ and $PS_{i,s}(m) \equiv h^{k_{i,s}}$, and the second signature piece value is $PS_{i,u}(m)$, which is given by $PS_{i,u}(m) \equiv PT_{i,s}(m)^{d_{i,u}} \mod_n$, where, $k_{i,s} = d_{i,s} \times v_i$, and h is a calculated value of $H(m, i)$, and H is a hash function.

A signature value PSi may be calculated by an equation $PS_i(m) = PS_{i,u}(m) \times PS_{i,s}(m) \mod_n$ using the first signature piece value ($PT_{i,s}(m), PS_{i,s}(m)$) and the second signature piece value $PS_{i,u}(m)$. The step (e) may confirm whether the signature value is valid when h given by an equation $h = H(m, i)$ by the semi-trusted party, where, H is a hash function, coincides with h' given by an equation $h' = PS_i(m)^{(e^{T-i+1} \times w_i)} \mod n$.

BRIEF DESCRIPTION OF THE DRAWINGS

The above aspects of the present invention will be more apparent by describing certain exemplary embodiments of the present invention with reference to the accompanying drawings, in which:

FIG. 3 is a table showing effects of an exemplary embodiment of the present invention.

DETAILED DESCRIPTION OF THE EXEMPLARY EMBODIMENTS

An exemplary embodiment of the present invention will be described with reference to the accompanying drawings in detail. In other instances, well known features have not been described in detail so as not to obscure the present invention.

Figure 1:
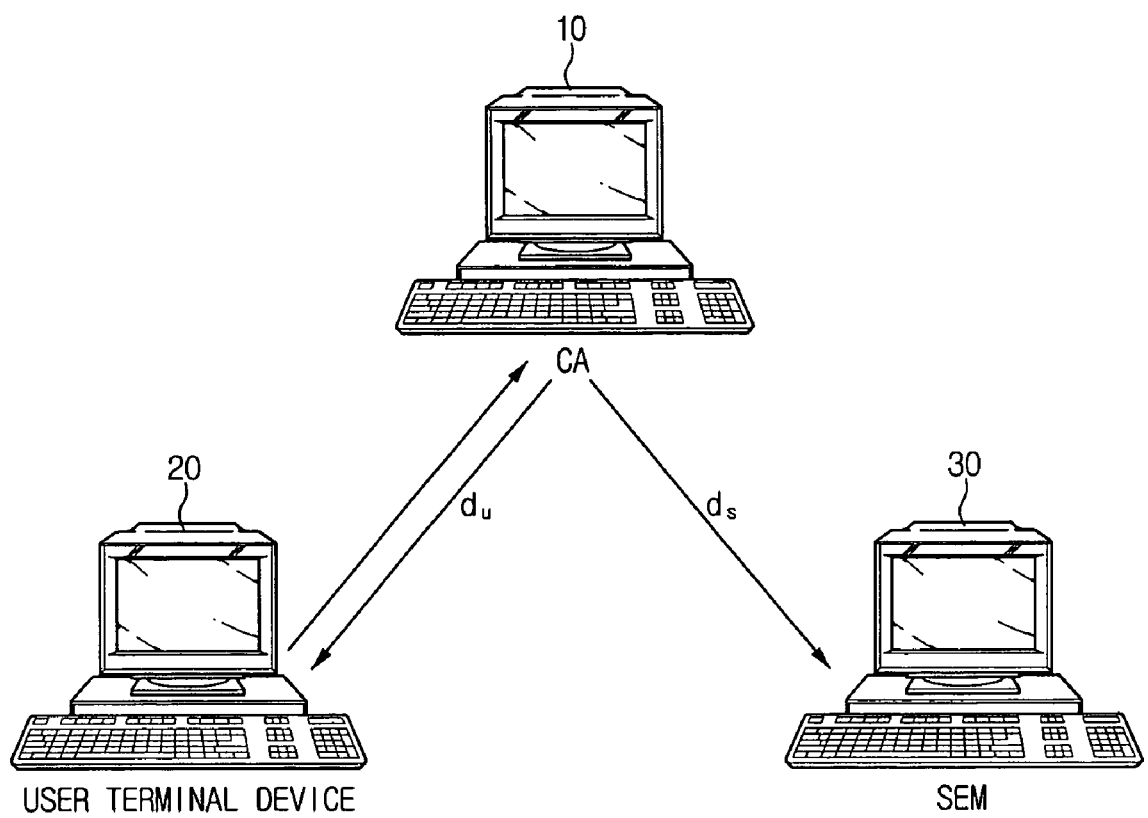
FIG. 1 is a view that illustrates a conventional security method in an mRSA scheme.
Figure 2:
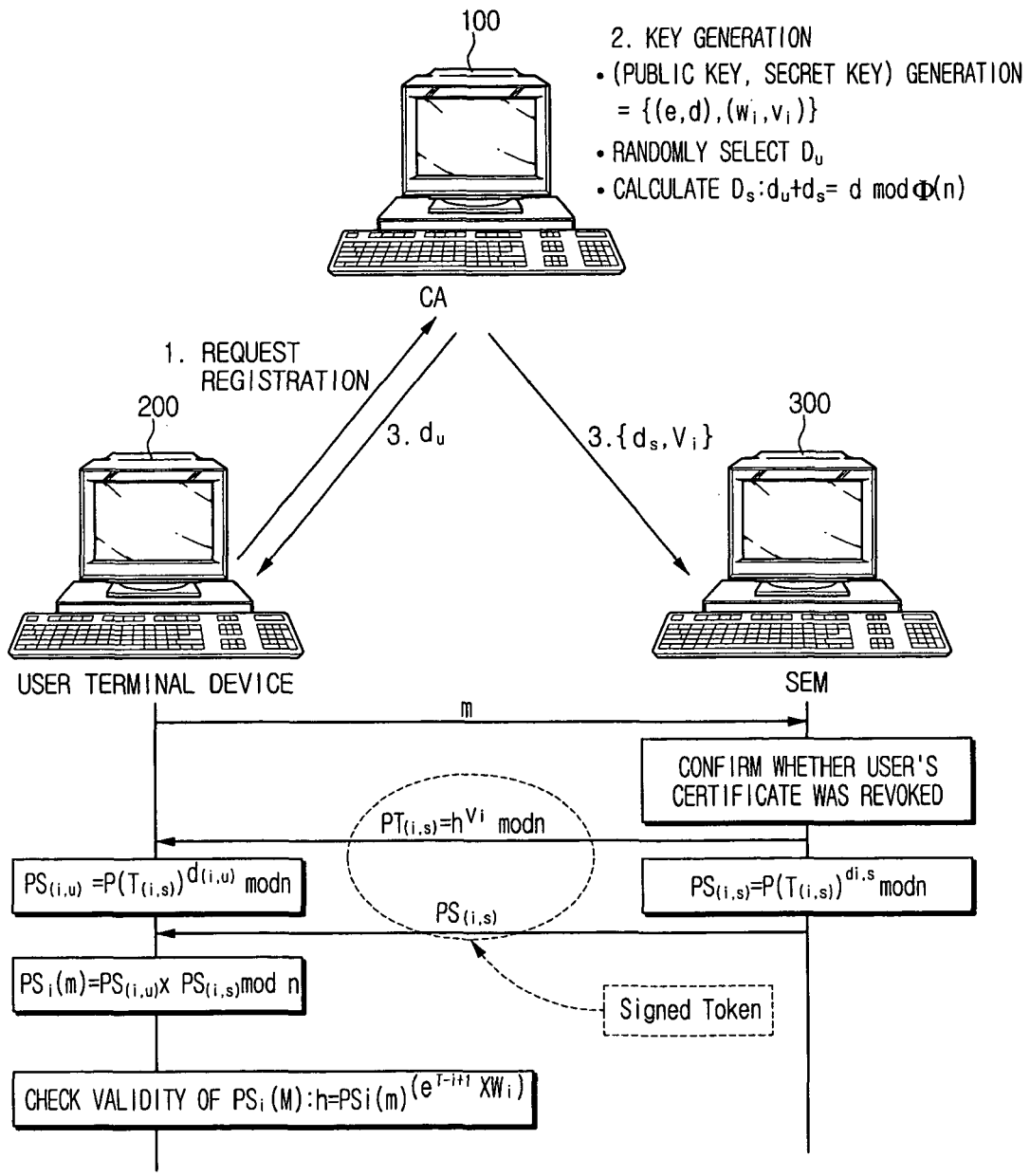
FIG. 2 is a view showing a system for executing a security method using an electronic signature according to an exemplary embodiment of the present invention.

FIG. 2 is a view showing a system for executing a security method using an electronic signature according to an exemplary embodiment of the present invention.

Referring to FIG. 2, a security system according to an exemplary embodiment of the present invention includes a user terminal device 200, a certificate authority (CA) 100, and a semi-trusted party (SEM) 300.

When a user requests the certificate authority 100 to register an electronic signature using the user terminal device 200, the authority party 100 generates a public key composed of e and $w_i$, and a secret key composed of d and $v_i$. The d is a secret key piece, which is divided into a user key $d_u$ computed by the user terminal device 200 and a computation key $d_s$ computed by the semi-trusted party 100. That is, the condition of $d = d_u + d_s$ is satisfied.

Since the semi-trusted party 300 has information related to a secret key piece $d_s$ of the user terminal device 200, it is referred to as a "semi-trusted server".

The certificate authority 100 issues the computed $d_{o,u}$ and $d_{o,s}$ to the user terminal device 200 and the semi-trusted party 300, respectively. The user terminal device 200 computes a user's secret key $d_{u,i}$ to be used in each period i using the issued $d_{o,u}$. The semi-trusted party 300 computes a mediator's secret key $d_{s,i}$ to be used in each period i using the issued $d_{o,x}$.

It is assumed that i is a sufficiently large even number. The certificate authority 100 generates encryption keys by various computations. The certificate authority 100 selectively generates two prime numbers p and q each having a size of $$\frac{i}{2}$$

bit. The certificate authority 100 calculates an equation $n=p*q$.

The certificate authority 100 selects different numbers e and $w_i$ that satisfy a condition given by $1<e, w_i<\Phi(n)$ under a condition of $\{e, w_i | 1 \leq i \leq T\} \subset Z_{\Phi(n)}^*$, where i represents an optional period when a time axis is divided by a predetermined time unit, and T represents a maximum value of an interval time to update an electronic signature generating and verifying system.

The certificate authority 100 calculates an equation 1 and an equation 2 to obtain d and $v_i$, respectively. $A = B \mod C$ means that a residue is A when B is divided by C. $\Phi(n)$ is an Euler's Phi function defined by a positive integer n, which is a function indicating the number of prime factors of n among positive integer number from 1 to n. For example, among 1, 2, 3, 4, 5, 6, prime factors of 6 are 2 and 3. In this case, $\Phi(6) = 2$.

$$d \equiv e^{-1} \bmod \Phi(n) \quad (1)$$

$$v_i \equiv w_i^{-1} \bmod \Phi(n) \quad (2)$$

In a case that a time is divided in predetermined units, when a time before one unit of i period is i−1, there no rules between $v_i$ and $v_{i-1}$. Accordingly, although one is found, a possibility to find the other is low.

Further, the certificate authority 100 selects an optimal number $d_u \in Z_n - \{0\}$, and calculates an equation 3.

$$d_s \equiv d - d_u \bmod \Phi(n) \quad (3)$$

where d is a secret key piece, which is divided into a user key $d_u$ computed by the user terminal device 200 and a computation key $d_s$ computed by the semi-trusted party 300. That is, the condition of $d = d_u + d_s$ is satisfied.

It is assumed that a user's secret key and a mediator's secret key of a real i period are $d_{i,u}$ and $d_{i,s}$, respectively. The certificate authority 100 should calculate $d_{0,u}$ and $d_{0,s}$, ahead of computations of the $d_{i,u}$ and $d_{i,s}$. The certificate authority 100 calculates $d_{0,u}$ and $d_{0,s}$ by equations 4, respectively.

$$d_{0,u} \equiv d_u \times e^{-T} \bmod \Phi(n)$$

$$d_{0,s} \equiv d_s \times e^{-T} \bmod \Phi(n) \quad (4)$$

The certificate authority 100 transmits the aforementioned calculated $d_{0,u}$ to the user terminal device 200, and transmits $d_{0,s}$ and $v_i$ satisfying $d_{0,s}, v_i | 0 \leq i \leq T$ to the semi-trusted party 300.

When i is set as a period in a case that a time axis is divided by a predetermined time, the user terminal device 200 and the semi-trusted party 300 calculate a user's secret key value $d_{i,u}$ and a mediator's secret key value $d_{i,s}$ during an i period by using equations (5), respectively.

$$d_{i,u} = d_{0,u} \times e^i$$

$$d_{i,s} = d_{0,s} \times e^i \quad (5)$$

It is assumed that i is set as a period in a case that a time axis is divided by a predetermined time. When a condition of $0 \leq i \leq T$ is satisfied, and m represents that a user will sign, the user terminal device 200 calculates h=H(m, i), and transmits the calculated h to the semi-trusted party 300.

On the other hand, the semi-trusted party 300 first confirms whether or not a user's certificate was already revoked. When the user's certificate was already revoked, an issue of a token requested from the user stops. Prior to issuing the token, the semi-trusted party 300 confirms whether or not the user's certificate was revoked using a CRL, thereby saving a user's trouble.

The semi-trusted party 300 calculates a mediator's secret key value $d_{i,s}$ during an i period, and calculates a signature key for the semi-trusted party 300 during the i period as indicated by an equation 6.

$$k_{i,s} = d_{i,s} * v_i \quad (6)$$

Then, the semi-trusted party 300 calculates a token by using equations 7.

$$PS_{i,s}(m) = h^{k_{i,s}}$$

$$PT_{i,s}(m) = h^{v_i} \quad (7)$$

The semi-trusted party 300 transmits the calculated ($PT_{i,s}$(m), $PS_{i,s}$(m),) to the user terminal device 200. The calculated ($PT_{i,s}$(m), $PS_{i,s}$(m)) are referred to as a 'signed token', namely, a 'first signature piece value'.

Further, the user terminal device 200 calculates a user's secret key value $d_{i,u}$.

On the other hand, the user terminal device 200 calculates a second signature piece value $PS_{i,u}$(m) using an equation 8, and calculates an equation 9 to complete a signature value.

$$PS_{i,u}(m) = PT_{i,s}(m)^{d_{i,u}} \bmod n \quad (8)$$

$$PS_i(m) = PS_{i,u}(m) \times PS_{i,s}(m) \bmod n \quad (9)$$

To authenticate a generated signature, the user terminal device 200 calculates an equation 10 to obtain h'.

$$h' = PS_i(m)^{(e^{T-i+1} \times w_i)} \bmod n \quad (10)$$

Next, the user terminal device 200 compares h' with h. When the h and h' are different from each other, the user terminal device 200 stops an issue of a document. On the contrary, when h and h' are identical with each other, the user terminal device 200 authorizes validating that $PS_i$(m) satisfies equations 11 as a signature related to a message m during the i period.

$$PS_i(m) \equiv (PS_{i,s}(m) \times PS_{i,u}(m)) \quad (11)$$

$$\begin{aligned} PS_i &= PS_{i,u} \times PS_{i,s} \\ &= (H(m,i)^{v_i})^{d_{i,u}} \times (H(m,i)^{v,i})^{d_{i,s}} \\ &= H(m,i)^{(d_0, u \times e^i) + (d_0, s \times e^i) \times vi} \\ &= H(m,i)^{((d_0, u \times e^{-T}) + (d_s \times e^{-T})) \times e^i \times vi} \\ &= H(m,i)^{d \times e^{i-T} \times vi} \end{aligned}$$

It is clear that equations 13 are satisfied when a valid signature is generated in accordance with an equation 12.

$$PS_i(m)^{(e^{T-i+1} \times wi)} \equiv H(m,i) \bmod n \quad (12)$$

It is assumed that a user's secret key value $d_{i,u}$ during the i period, a mediator's secret key value $d_{i,s}$ during the i period, and a time key value $v_i$ for the semi-trusted party 300 during the i period are exposed to an attacker.

The attacker needs three keys $d_{i-1,u}$, $d_{i-1,s}$, and $v_{i-1}$ in order to compare a signature. However, as noted previously, since each of $v_i$ and $v_{i-1}$ is an optimal number, they are not associated with each other. It is extremely difficult for the attacker to analogize the $v_{i-1}$.

Even if the attacker calculates $h^{d_{i-1,u} \times d_{i-1,s}} \bmod n$ using equations 13 and 14, the attacker cannot easily compare a signature for a message m during i−1 period.

$$d_s = d_{i,s} \times e^{T-i}$$

$$d_u = d_{j,u} \times e^{T-j} \quad (13)$$

$$h = H(m, i-1)^d \quad (14)$$

FIG. 3 is a table showing effects of an exemplary embodiment of the present invention. With reference to FIGS. 2 and 3, a power calculation with respect to a user's key calculated by the user terminal device 200 is the same as that in a weak forward security scheme. However, a power calculation of $e^i + (2 \times v_i)$ in the semi-trusted party 300 needs two tokens. Since the semi-trusted party 300 is a central server, such a calculation is easy. For a forward security, the semi-trusted party 300 should further store T secret keys $V_i$.

A user selectively stores $w_i$ by using the user terminal device 200. However, a size of $w_i$ is relatively smaller than that of a secret key. Accordingly, an operation of the user terminal device 200 will be easy.

Figure 4:
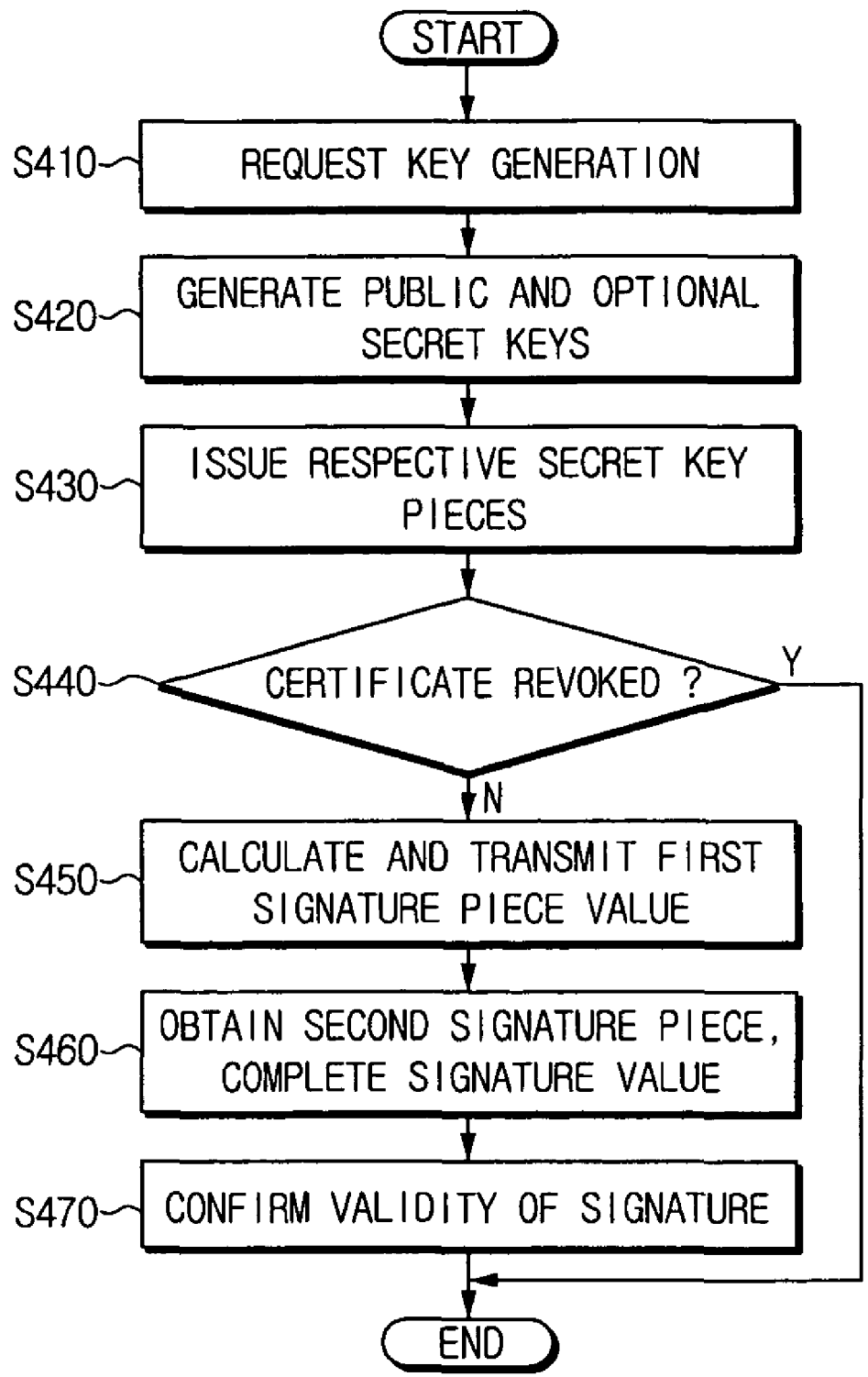
FIG. 4 is a flow chart illustrating a security method using an electronic signature according to an exemplary embodiment of the present invention.

FIG. 4 is a flow chart illustrating a security method using an electronic signature according to an exemplary embodiment of the present invention.

Referring to FIGS. 2 and 4, the user terminal device 200 requests the certificate authority 100 to generate a key to be used in an electronic signature (step S410). The request for key generation from the user terminal device 200 is achieved through a registration request of a certificate at the certificate authority 100.

In response to the request for the key generation, the certificate authority 100 generates a public key composed of e and $w_i$, and an optimal secret key composed of d and $v_i$ (step S420). Here, d is divided into secret key pieces $d_u$ and $d_s$.

Furthermore, the certificate authority 100 issues secret key pieces calculated based on the $d_u$ and $d_s$ to the user terminal device 200 and the semi-trusted party 300, respectively (step S430).

On the other hand, the semi-trusted party 300 confirms whether or not a user's certificate has been revoked (step S440). When the user's certificate has been revoked, the semi-trusted party 300 stops the issuance of a key that a user requested.

When the user's certificate has not been revoked, the semi-trusted party 300 calculates a secret key piece to be used during a corresponding period using a secret key piece issued by the certificate authority 300, and then calculates and transmits a first signature piece value (step S450). Here, the first signature piece value includes signed tokens ($PT_{i,s}(m)$, $PS_{i,s}(m)$) obtained by calculating the equation 7.

The user terminal device 200 calculates the equation 8 to obtain a second signature piece, and calculates the equation 9 to complete a signature value (step S460).

In order to authenticate a generated signature value, the user terminal device 200 calculates the equation 10 to obtain h'. Moreover, the user terminal device 200 confirms a validity of a signature according to whether or not h' coincides with a calculated h (step S470). When h' is identical to the calculated h, a verifier verifying the signature using the user terminal device 200, accepts $PS_i(m)$ as a valid signature value.

Through the aforementioned procedure, in a state that an attacker and a user conspire with each other, or many users conspire with each other, by including an optionally selected secret key piece in a secret key, a security subject with a forward security may be effectuated.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

As mentioned above, the security method using an electronic signature according to exemplary embodiments of the present invention efficiently manages and authenticates using a mediator. In addition, the security method of the present invention guarantees a forward security to prevent documents from being forged by including a selected key in a secret key piece constituting a secret key as an optional number, with the result that information may be effectively protected.

What is claimed is:

1. A security method using an electronic signature, comprising:
   (a) generating a public key and an secret key comprising two pieces of information which are independent of each other, by a certificate authority, in response to a request from a user terminal device, wherein the public key comprises a first public key value and a second public key value, and the secret key comprises a first secret key piece computed based on the first public key value and a second secret key piece computed based on the second public key value, and the first secret key piece is divided into a user's secret key and a mediator's secret key;
   (b) issuing the two pieces of information the user's secret key to the user terminal device and the mediator's secret key and the second secret key piece to a semi-trusted party, respectively;
   (c) transmitting a first signature piece generated from-based on the computation key and the second key piece the two issued pieces of information of the secret key, to the user terminal device from the semi-trusted party when a certificate of the user terminal device is still valid;
   (d) utilizing the first signature piece and a second signature piece, by the user terminal device, to generate a signature value, the second signature piece being generated by a combination of the first signature piece an issued secret key piece and a predetermined value; and
   (e) confirming whether the signature value is valid.

2. The method as claimed in claim 1, wherein in the operation (a), the public key (e, $w_i$) is an optimal number satisfying a condition given by $1<e$, $w_i\phi(n)$ under a condition of $\{e, w_i | 1 \leq i \leq T\} Z^*_{\phi(n)}$, by calculating an equation $n=p*q$, where, it is assumed that i is an optimal even number, p and q each is a predetermined prime number having $$\frac{i}{2}$$

bits, i represents an period when a time axis is divided by a predetermined time unit, and T represents a maximum value of an interval time to update an electronic signature generating and verifying system,
   wherein the first public key value is the value e, and the second public key value is the value $w_i$.

3. The method as claimed in claim 2, wherein in the operation (a), the secret key generated by the certificate authority is (d, $v_i$), which is given by equations $d \equiv e^{-1} \mod \phi(n)$ and $v_i \equiv w_i^{-1} \mod \phi(n)$,
   wherein the first secret key piece is the value d, and the second secret key piece is the value $v_i$.

4. The method as claimed in claim 3, further comprising: calculating a user key $d_u$ and a computation key $d_s$, which is given by an equation $d_s = d - d_u \mod \Phi(n)$, where, it is satisfied that $d = d_u + d_s$, and $d_u$ is an optimal number satisfying a condition of $d_u \in Z_n - \{0\}$.

5. The method as claimed in claim 4, wherein in the operation (b), the certificate authority calculates and issues the user's secret key value $d_{0,u}$ during a first period, which is given by $d_{0,u} \equiv d_u \times e^{-T} \mod \Phi(n)$, and the mediator's secret key value $d_{0,s}$ during the first period, which is given by $d_{0,s} \equiv d_s \times e^{-T} \mod \Phi(n)$, to the user terminal device and the semi-trusted party.

6. The method as claimed in claim 4, wherein the user terminal device calculates a user's secret key value $d_{i,u}$ during period i using the issued $d_{0,u}$ according to an equation $d_{i,u} = d_{0,u} \times e^i$, and the semi-trusted party calculates a mediator's secret key value $d_{i,s}$ during period i using the issued $d_{0,s}$ according to an equation $d_{i,s} = d_{0,s} \times e^i$.

7. The method as claimed in claim 6, wherein the first signature piece value is $PT_{i,s}(m)$ and $PS_{i,s}(m)$, where $PT_{i,s}(m) = h^{v_i}$ and $PS_{i,s}(m) \equiv h^{k_{i,s}}$, and the second signature piece value is $PS_{i,u}(m)$, where $PS_{i,u}(m) \equiv PT_{i,s}(m)^{d_{i,u}} \mod n$, $k_{i,s} = d_{i,s} * v_i$, and h is a calculated value of H(m, i), H being a hash function.

8. The method as claimed in claim 7, wherein a signature value $PS_i$ is calculated by an equation $PS_i(m)=PS_{i,u}(m) \times PS_{i,s}(m) \bmod n$ using the first signature piece value ($PT_{i,s}(m)$, $PS_{i,s}(m)$) and the second signature piece value $PS_{i,u}(m)$.

9. The method as claimed in claim 8, wherein in operation (e), the semi-trusted party confirms whether the signature value is valid when h is determined by an equation $h=H(m, i)$, H is a hash function, and h coincides with h' given by an equation $h'=PS_i(m)^{(e^{T-i+1} \times w_i)} \bmod n$.

* * * * *